(12) United States Patent
Yu et al.

(10) Patent No.: US 11,097,711 B2
(45) Date of Patent: Aug. 24, 2021

(54) TRACTION CONTROL FOR A HYBRID ELECTRIC POWERTRAIN

(71) Applicant: FORD GLOBAL TECHNOLOGIES, LLC, Dearborn, MI (US)

(72) Inventors: Hai Yu, Canton, MI (US); Michael G. Fodor, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1345 days.

(21) Appl. No.: 14/258,257

(22) Filed: Apr. 22, 2014

(65) Prior Publication Data
US 2015/0298678 A1 Oct. 22, 2015

(51) Int. Cl.
*B60W 10/06* (2006.01)
*B60W 10/08* (2006.01)
(Continued)

(52) U.S. Cl.
CPC ............ *B60W 10/06* (2013.01); *B60W 10/08* (2013.01); *B60W 10/26* (2013.01); *B60W 20/10* (2013.01);
(Continued)

(58) Field of Classification Search
CPC ...... B60W 10/06; B60W 10/08; B60W 20/00; B60W 2540/10; B60W 2520/10; B60W 2710/083; B60W 2540/12; B60W 2540/16; B60W 10/26; B60W 2510/244; B60W 2710/0666; B60W 10/02; B60W 10/10; B60W 10/115; B60W 20/102; B60W 20/1082; B60W 2510/0638; B60W 2710/105; Y02T 10/6286; Y02T 10/642; Y02T 10/6239; Y02T 10/7077; Y02T 10/48; Y02T 10/6217; Y02T 10/6221;
(Continued)

(56) References Cited

U.S. PATENT DOCUMENTS 5,492,192 A 2/1996 Brooks et al.
6,295,487 B1 * 9/2001 Ono .................. B60K 6/44
701/22
(Continued)

FOREIGN PATENT DOCUMENTS

JP 2006160104 A * 6/2006 ............ B60W 20/30
JP 2013052693 A * 3/2013
JP 2015196455 A * 11/2015

OTHER PUBLICATIONS

Yamaguchi, Takezo, Machine translation of JP-2006160104-A, Jun. 2006, espacenet.com (Year: 2006).*
(Continued)

*Primary Examiner* — David P. Merlino
(74) *Attorney, Agent, or Firm* — David B. Kelley; MacMillan, Sobanski & Todd, LLC

(57) ABSTRACT

An electric machine and internal combustion engine are coordinated to provide traction control for an automotive vehicle. A propulsive torque limit is set by a controller during a loss of traction. When the machine torque limit is greater than the propulsive torque limit, the engine is pulled down. When the machine torque is less than the propulsive torque limit, the engine is pulled up. The controller coordinates the pulled up engine with the machine such that the engine is subordinated to the machine.

13 Claims, 3 Drawing Sheets

(51) Int. Cl.
  *B60W 30/18* (2012.01)
  *B60W 10/26* (2006.01)
  *B60W 20/10* (2016.01)
  B60W 50/00 (2006.01)
  B60K 6/445 (2007.10)

(52) U.S. Cl.
  CPC ....... *B60W 30/18172* (2013.01); *B60K 6/445* (2013.01); *B60W 2050/0049* (2013.01); *B60W 2050/0056* (2013.01); *B60W 2510/083* (2013.01); *B60W 2510/244* (2013.01); *B60W 2510/246* (2013.01); *B60W 2520/10* (2013.01); *B60W 2520/105* (2013.01); *B60W 2520/26* (2013.01); *B60W 2552/40* (2020.02); *B60W 2710/0666* (2013.01); *B60W 2710/083* (2013.01); *B60W 2710/248* (2013.01); *B60W 2720/30* (2013.01); *Y02T 10/62* (2013.01)

(58) Field of Classification Search
  CPC ............. Y02T 10/6265; Y02T 10/7275; B60L 2240/423; B60L 2240/486; B60L 11/14; B60L 2240/441; B60L 11/123; B60L 2240/12; B60L 2240/421; B60L 2240/425; B60L 2240/443; B60L 2250/26; B60K 6/365; B60K 6/445; B60K 1/02; B60K 6/48; Y10T 477/23; Y10T 477/26; B60Y 2400/432; Y10S 903/916
  USPC ......... 701/22, 54, 70, 102, 532; 180/65.235; 477/3, 5, 200; 290/40 C; 123/406.23
  See application file for complete search history.

(56) References Cited

U.S. PATENT DOCUMENTS

| | | | |
|---|---|---|---|
| 7,222,014 B2 | 5/2007 | Tao et al. | |
| 7,314,424 B2 | 1/2008 | Supina et al. | |
| 7,792,625 B2 | 9/2010 | Hrovat et al. | |
| 9,651,101 B2* | 5/2017 | Tamai | B60W 30/02 |
| 2003/0085576 A1* | 5/2003 | Kuang | B60K 6/445 |
| | | | 290/400 |
| 2003/0216215 A1* | 11/2003 | Suzuki | B60K 6/46 |
| | | | 477/5 |
| 2004/0030480 A1* | 2/2004 | Kadota | B60K 6/44 |
| | | | 701/70 |
| 2004/0034460 A1* | 2/2004 | Folkerts | B60W 30/188 |
| | | | 701/54 |
| 2004/0134697 A1* | 7/2004 | Kobayashi | B60W 10/023 |
| | | | 180/65.26 |
| 2005/0061564 A1* | 3/2005 | Kuang | B60W 20/13 |
| | | | 180/65.235 |
| 2005/0181907 A1* | 8/2005 | Colvin | B60K 6/365 |
| | | | 477/3 |
| 2005/0255968 A1* | 11/2005 | Sah | B60K 6/445 |
| | | | 477/200 |
| 2006/0080022 A1 | 4/2006 | Hrovat et al. | |
| 2007/0038340 A1* | 2/2007 | Sekiguchi | B60L 3/10 |
| | | | 701/22 |
| 2007/0112495 A1* | 5/2007 | Murray | F16H 59/48 |
| | | | 701/70 |
| 2009/0115246 A1* | 5/2009 | Yanagida | B60L 3/06 |
| | | | 303/144 |
| 2010/0010732 A1* | 1/2010 | Hartman | G01C 21/3469 |
| | | | 701/532 |
| 2010/0056325 A1* | 3/2010 | Kahn | B60K 6/365 |
| | | | 477/3 |
| 2010/0145559 A1* | 6/2010 | Gauthier | B60K 6/365 |
| | | | 701/22 |
| 2010/0312422 A1* | 12/2010 | Imaseki | B60W 10/02 |
| | | | 701/22 |
| 2011/0172863 A1* | 7/2011 | Yu | B60K 6/442 |
| | | | 701/22 |
| 2011/0288697 A1* | 11/2011 | Yu | B60K 6/48 |
| | | | 701/22 |
| 2012/0083955 A1* | 4/2012 | Noguchi | B60L 15/20 |
| | | | 701/22 |
| 2012/0130579 A1* | 5/2012 | Steuernagel | B60K 6/442 |
| | | | 701/22 |
| 2012/0138016 A1* | 6/2012 | Martin | F02D 37/02 |
| | | | 123/406.23 |
| 2012/0210325 A1* | 8/2012 | de Lind van Wijngaarden | H04W 52/0258 |
| | | | 718/103 |
| 2013/0184966 A1* | 7/2013 | Lockwood | F02D 29/02 |
| | | | 701/102 |
| 2013/0296112 A1* | 11/2013 | Yamazaki | B60W 20/00 |
| | | | 477/5 |
| 2013/0325227 A1* | 12/2013 | Whitney | B60W 10/06 |
| | | | 701/22 |
| 2013/0325228 A1* | 12/2013 | Whitney | B60W 10/06 |
| | | | 701/22 |
| 2014/0100727 A1* | 4/2014 | Pietron | B60W 10/06 |
| | | | 701/22 |

OTHER PUBLICATIONS

Kano, Toshihiro, Machine translation of JP-2013052693-A, Mar. 2013, espacenet.com (Year: 2013).*
Sato Ryoji, Machine translation of JP-2015196455-A, Nov. 2015, espacenet.com (Year: 2015).*

* cited by examiner

TRACTION CONTROL FOR A HYBRID ELECTRIC POWERTRAIN

BACKGROUND OF INVENTION

The present invention relates to a method of controlling an automotive powertrain and in particular to traction control for a hybrid electric automotive powertrain.

For an automotive vehicle, a loss of traction occurs when wheels of the vehicle slip due to a road friction force being too low. In the vehicle using a conventional powertrain, traction control to mitigate the loss of traction is implemented by either reducing torque produced by an internal combustion engine, modulating braking, or both. Compared to using the engine and brakes in a conventional powertrain, an electric traction motor in a hybrid powertrain has a greater control bandwidth and higher accuracy of delivering torque. The greater control bandwidth and higher accuracy of torque delivery for the machine may allow for more effective traction control in a vehicle using a hybrid powertrain than a vehicle using a conventional powertrain.

However, an output torque of the machine at a given time varies more than for an engine. For example, the output torque of the machine may be affected by factors including a battery power limit, a power electronic system torque limit, an operating temperature of the hybrid powertrain, and operational states of the machine and powertrain.

SUMMARY OF INVENTION

An embodiment contemplates a method of controlling an automotive powertrain. A propulsive torque limit is set when a loss of tire traction is detected. An engine and electric machine are controlled in response to the loss of traction. The engine is stopped when a machine torque limit exceeds the propulsive limit. A future machine torque limit is determined and the engine restarted when the propulsive limit exceeds the future limit.

Another embodiment contemplates a method of controlling an automotive powertrain. A propulsive torque limit is set when a loss of tire traction is detected. An engine and electric machine are controlled in response to the loss of traction. It is determined if the propulsive limit exceeds a machine torque limit. An engine torque is limited while using the engine to supplement the machine to meet the propulsive limit.

Another embodiment contemplates a method of controlling an automotive powertrain. A propulsive torque limit is set when a loss of tire traction is detected. An engine and electric machine are controlled in response to the loss of traction. An engine offset margin is calculated. The machine is commanded to operate as a generator while increasing an engine torque limit by the engine torque offset margin.

An advantage of an embodiment is that the use of the machine for traction control is coordinated with the engine. This reduces wheel slip, which in turn improves efficiency of the powertrain propelling the vehicle.

DETAILED DESCRIPTION

Figure 1:
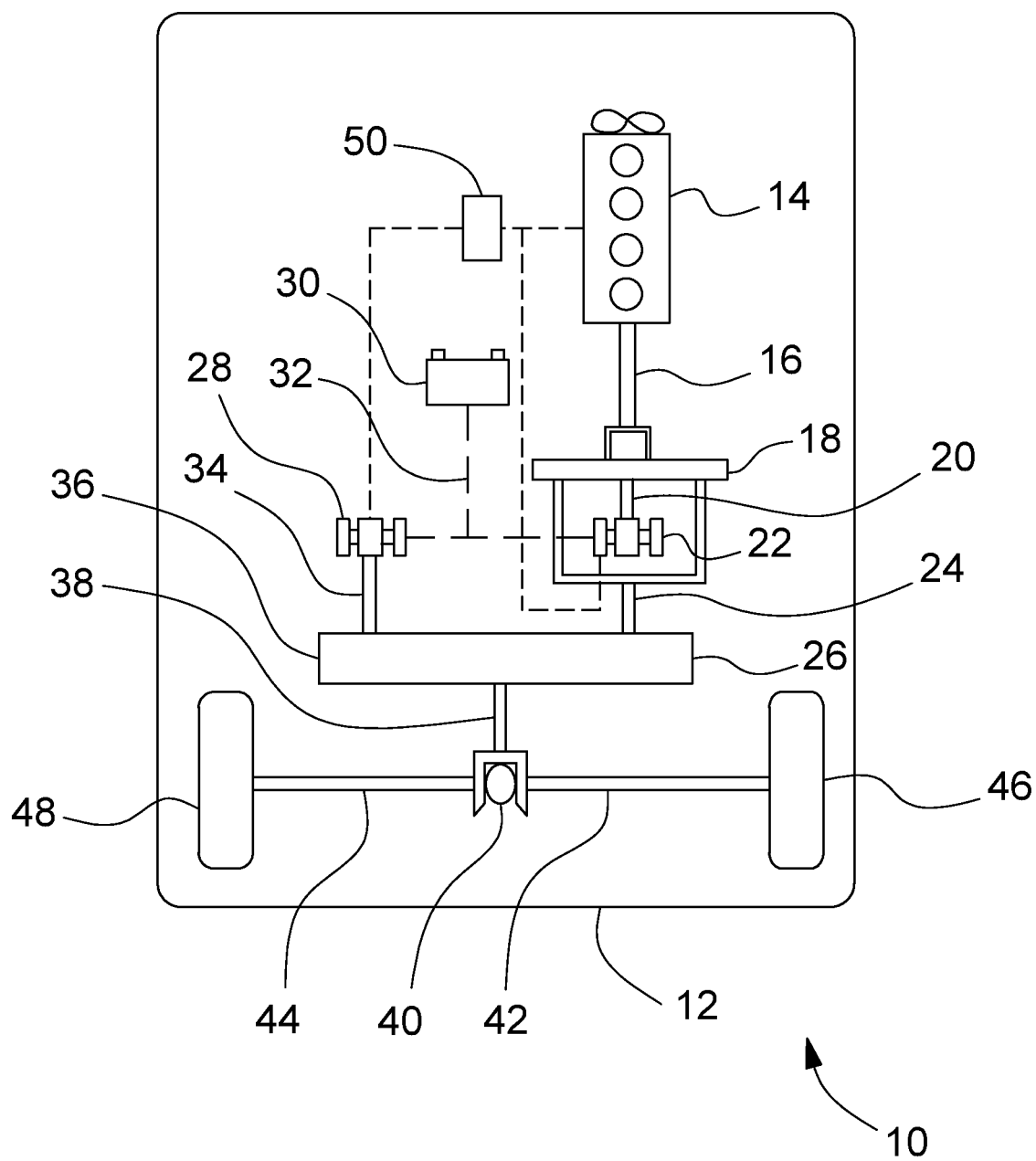
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, and all wheel drive types of powertrains. As described, the powertrain 10 is a hybrid electric powertrain with an internal combustion engine, but may also be another suitable powertrain known to one skilled in the art.

The powertrain 10 includes an internal combustion engine 14 powering a crankshaft 16. The crankshaft 16 transmits torque from the engine 14 to a planetary gear set 18. Also connected to the planetary gear set 18 by a torque transmitting input 20 is a first electric machine 22, which may be a generator or motor/generator. Torque is transmitted via a shaft 24 between the planetary gear set 18 and a gearing 26. A second electric machine 28, which may be an electric motor or motor/generator, is connected to a battery 30 by an electrical bus 32. The electrical bus 32 also connects the second machine 28 and battery 30 to the first machine 22. The second machine 28 is connected via a torque transmitting shaft 34 to the gearing 36. An output 38 transmits torque from the gearing 36 to a differential 40. The differential 40 transmits torque to first and second axles 42 and 44, respectively, which drive first and second wheels 46 and 48, respectively. A controller 50 directs the operation of the powertrain 10. The controller 50 directs operation of the powertrain 10, in part by interfacing with, and directing the operation of, the engine 14, first machine 22, and second machine 28.

The controller 50 may execute a traction control routine when a loss of traction is detected. As understood by one skilled in the art, the traction control routine may adjust torque outputs of the engine 14 and second machine 28, without use of brakes, to improve propulsion of the vehicle 12 during the loss of traction.

A propulsive torque for the vehicle 12 is equal to the sum of a torque produced by the engine 14 and a torque produced by the second machine 28. The second machine torque is constrained by positive and negative torque limits. The positive and negative torque limits are set by the controller 50 as functions of a present speed of the vehicle, discharge and charge power limits of the battery 30, and a present state of charge and temperature of the battery 30. During the loss of traction, the controller 50 sets a propulsive torque limit as the minimum of a torque request and a traction control torque limit.

Sources of the torque request may include a driver or cruise control system of the vehicle 12. The traction control torque limit is a wheel torque expected to be delivered on the first and second wheels 46 and 48, respectively. The wheel torque will not exceed the traction control torque limit. However, the wheel torque will not be less than the traction control torque limit if a driver is requesting additional torque be delivered to the first and second wheel 46 and 48, respectively. When the second machine torque is insufficient to meet the limited propulsive torque, the controller 50 coordinates operation of the engine torque to supplement the second machine torque.

Figure 2:
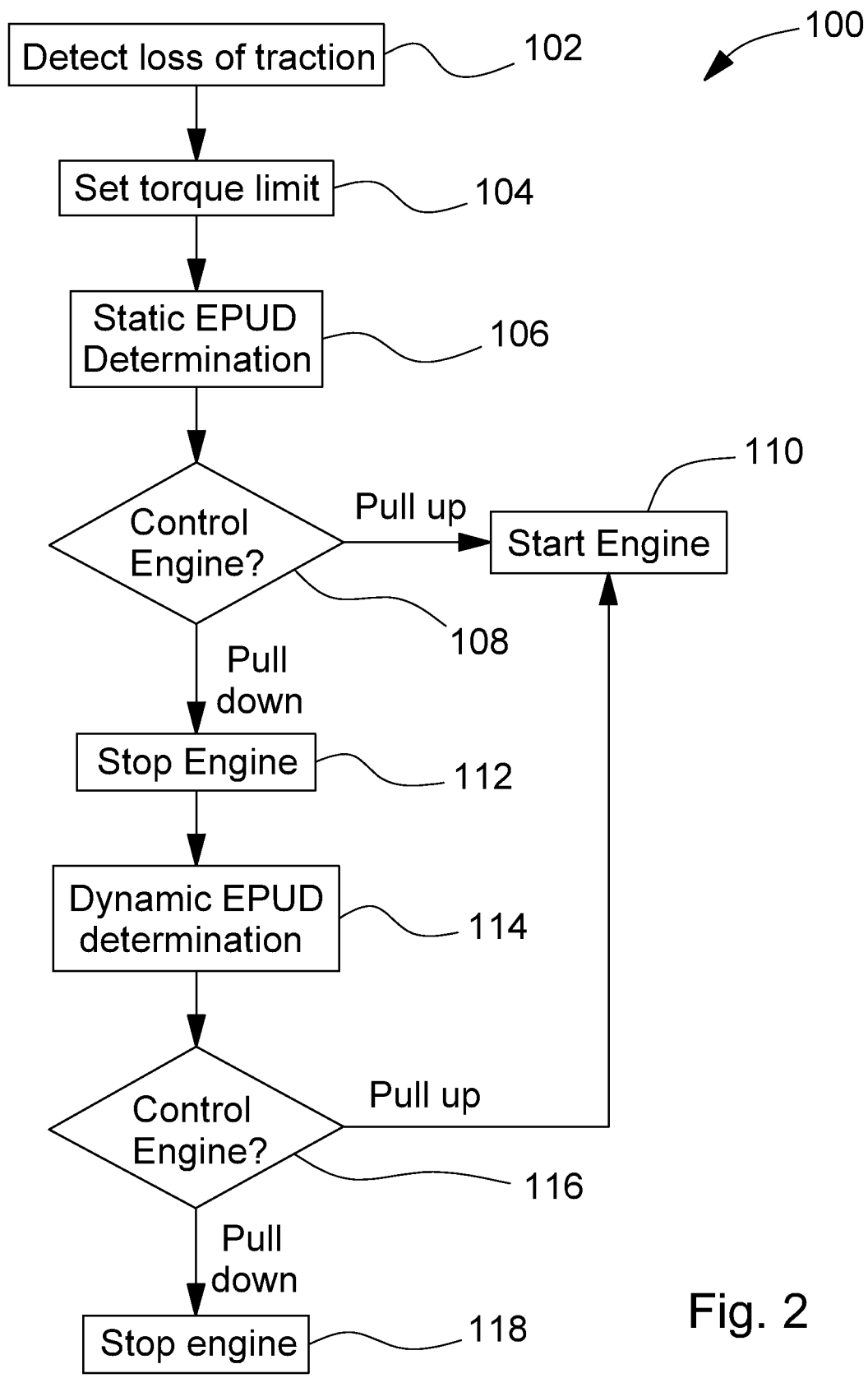
FIG. 2 is a flow chart of a control routine for a hybrid electric powertrain.
Figure 3:
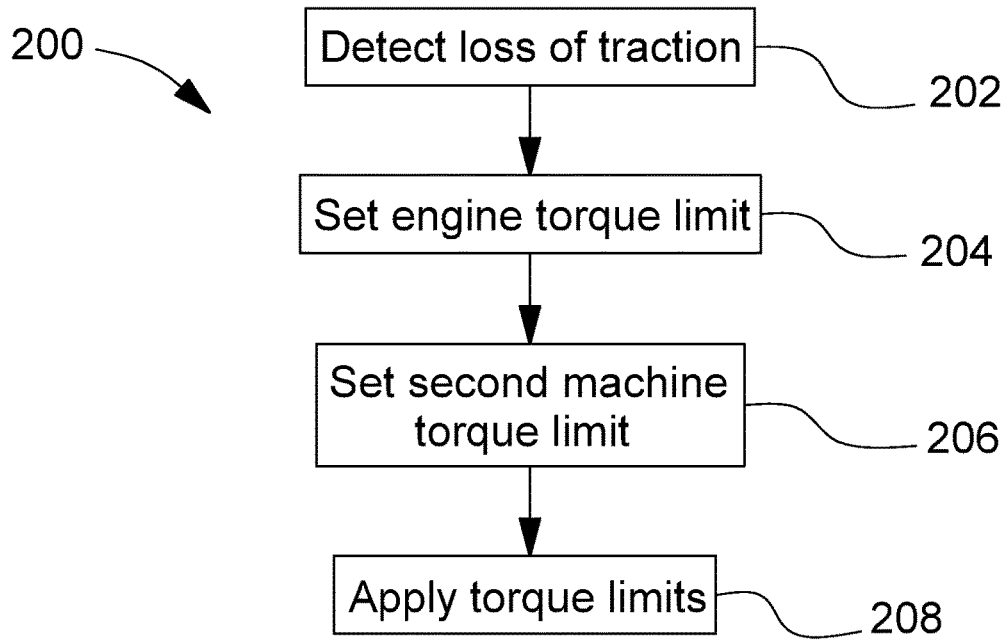
FIG. 3 is a flow chart of a control routine for a hybrid electric powertrain.
Figure 4:
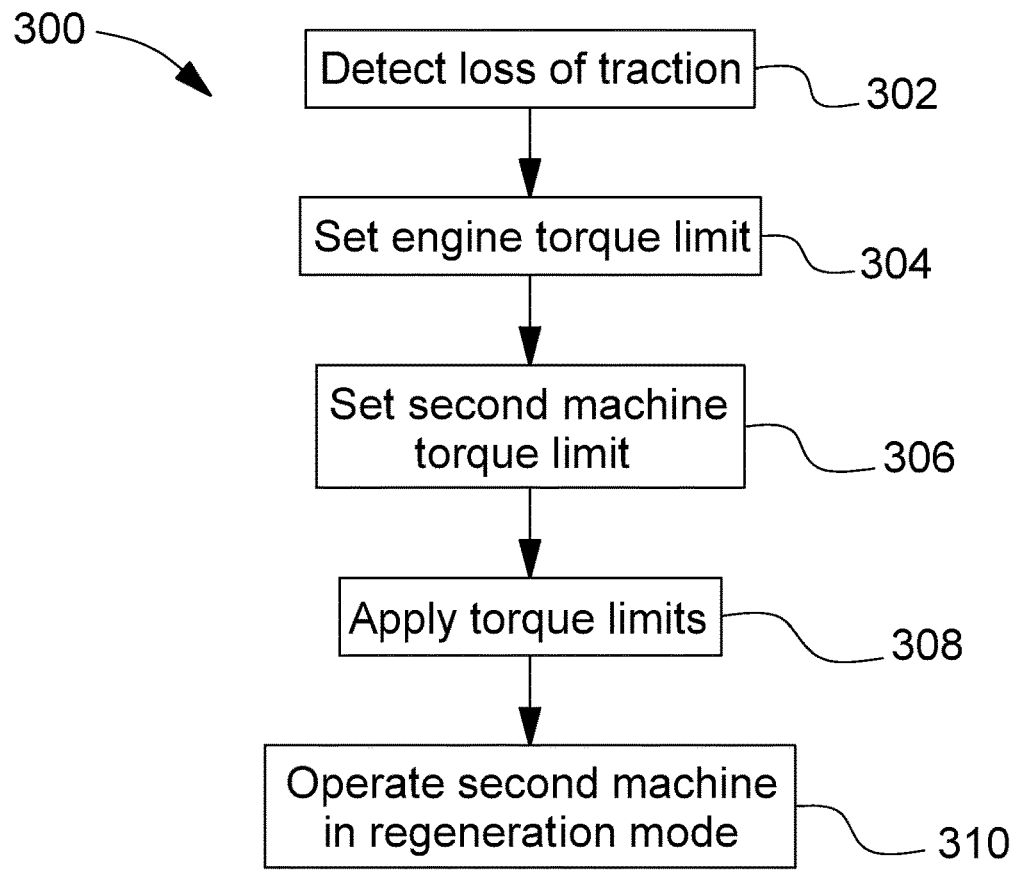
FIG. 4 is a flow chart of a control routine for a hybrid electric powertrain.

FIGS. 2-4 illustrate a method of operation of the powertrain 10 of FIG. 1. Whether the second machine 28 can meet the traction control requirement is evaluated. If torque available from the second machine 22 is greater than or equal to the propulsive torque limit, then the method continues with the steps of FIG. 2. Otherwise, when torque available from the second machine 22 is less than the propulsive torque limit, the method continues with the steps of FIG. 3. If torque available from the second machine 22 is less than the propulsive torque limit, and the second machine 22 is severely constrained by the positive torque limit, then the method continues with the steps of FIG. 4.

FIG. 2 will now be discussed with reference to FIG. 1. FIG. 2 illustrates a control routine 100 for the powertrain 10 when the second machine 28 has sufficient torque to meet the traction control torque limit. In the control routine 100, if torque available from the second machine 28 is greater than the propulsive torque limit, then the engine 14 may be pulled down.

In a step 102, the controller 50 detects the loss of traction. For example, the loss of traction may be for first and second wheels 46 and 48, respectively. Detecting the loss of traction is known by those skilled in the art and so will not be discussed in more detail herein. For example, the controller 50 may detect that a rotational speed difference between the first wheel 46 and the second wheel 48 is sufficiently great to indicate the loss of traction is occurring.

In a step 104, after the loss of traction is detected, the controller 50 caps the propulsive force delivered to the first and second wheels 46 and 48, respectively, at the propulsive torque limit, i.e., the lesser of the torque request and traction control torque limit. During the loss of traction, the traction control torque limit is much less than the torque request and will be used as the propulsive torque limit.

In a step 106, a static engine pull up/pull down (EPUD) determination is made. When the static EPUD determination is made, the traction control torque limit is less than the torque request, the vehicle speed is less than a vehicle speed threshold, and road friction is less than a road friction threshold. A machine torque limit is the positive torque limit reduced by an offset torque amount. For example, the offset torque amount may be a positive offset torque amount. When the traction control torque limit is less than the positive torque limit reduced by a first positive offset torque (also called "positive torque offset" herein) amount, the engine 14 is pulled down. When the traction control torque limit is greater than the positive torque limit reduced by a second positive offset torque amount, the engine 14 will be pulled up. The positive torque limit reduced by the first or second positive offset torque amount is an available torque for the first or second machines 22 and 28, respectively. The first and second positive offset torque amounts are torque buffers that may be predefined or determined as a function of the present battery state of charge and vehicle speed. The first and second positive offset torque amounts also create a hysteresis region to avoid oscillation of the engine during EPUD.

In a step 108, the controller 50 acts on the static EPUD determination. If the static EPUD determination is to pull up the engine 14, then, the controller 50 commands the engine 14 to be started in a step 110. If the static EPUD determination is to pull down the engine 14, then the controller 50 commands the engine 14 to be stopped in a step 112. After commanding the engine 14 to be stopped, a dynamic EPUD determination is made in a step 114. When the engine pull up or pull down command matches a current operating state of the engine 14, no engine pull up or pull down command is made.

In a step 114, the dynamic EPUD determination is made, during which a relationship between the traction control torque limit and the second machine torque is dynamically monitored during a future time window. The future time window may be adjusted as the traction control routine progresses. For example, the future time window may be different while the traction control routine is engaged than when the traction control routine is ramping up torque to exit the routine. The controller 50 uses linear dynamic extrapolation to predict a future discharge power limit (also called "future battery discharge power limit" herein) for the future time window. The future discharge power limit is predicted as a function of the present battery state of charge and temperature as well as a mean average variation rate of the battery state of charge and temperature. Concurrently with predicting the future discharge power limit, the controller 50 determines a predicted vehicle speed as a function of a maximal future vehicle speed in the future time window. Future vehicle speeds during the future time window may be predicted using a second order vehicle longitudinal vehicle speed model that is a function of a present vehicle speed, a present acceleration rate, and an assumption that the acceleration rate will be kept constant during the future time window. A worst case torque limit (also called a "future machine torque limit" herein) is calculated for the future time window as the future discharge power limit divided by the predicted vehicle speed, where the predicted vehicle speed is greater than zero.

The worst case torque limit is then used in the dynamic EPUD determination. When the worst case torque limit is less than the positive torque limit reduced by the first positive offset torque amount, the engine 14 will be pulled down. When the worst case torque limit is greater than the positive torque limit reduced by the second positive offset torque amount, the engine 14 will be pulled up. When the worst case torque limit is determined, the vehicle speed is less than a vehicle speed threshold, and road friction (also called "estimated road friction condition" herein) is less than a road friction threshold.

In a step 116, the controller 50 acts on the dynamic EPUD determination. If the dynamic EPUD determination is to pull up the engine 14, then the controller 50 commands the engine 14 to be started in a step 110. If the dynamic EPUD determination is to pull down the engine 14, then the engine 14 remains stopped in a step 118.

FIG. 3 will now be discussed with reference to FIG. 1. FIG. 3 illustrates a control routine 200 for the powertrain 10 when the second machine 28 has insufficient torque alone to meet the traction control torque limit. In the control routine 200, if torque available from the second machine 28 is less than the propulsive torque limit, then the engine 14 will satisfy a portion of the propulsive torque limit. As a result, the engine torque is subordinated to the second machine torque.

In a step 202, the controller 50 detects the loss of traction. For example, the loss of traction may be for first and second wheels 46 and 48, respectively.

In a step 204, after the loss of traction is detected, the controller 50 sets an engine torque limit. The engine torque limit is a filtered traction control torque limit reduced by the positive torque limit and increased by a constant engine torque offset margin. The filtered traction control torque limit partitions both torque magnitude and frequency domain between the engine 14 and the second machine 22. By using the filtered traction control torque limit, the engine 14 meets the propulsive torque limit in a low frequency range only while the machine 22 meets a high frequency range of the propulsive torque limit.

The filtered traction control torque limit is determined by passing the traction control torque limit through a low pass filter to keep delivery of torque from the engine 14 available in a very low bandwidth region. The constant engine torque offset margin assures a sufficient torque margin for the second machine 28 to provide high frequency torque modulation.

In a step 206, the controller 50 sets a second machine torque limit. The second machine torque limit is the traction control torque limit reduced by the engine torque limit.

In a step 208, the controller 50 applies the engine and second machine torque limits to operation of the engine 14 and second machine 28 during the loss of traction.

FIG. 4 will now be discussed with reference to FIG. 1. FIG. 4 illustrates a control routine 300 for the powertrain 10 when the second machine 28 is constrained by the discharge power limit. Because the control routine 300 is a variation of the control routine 200 of FIG. 3, like reference numerals (in the 300 series rather than 200 series) designate corresponding steps in the drawings and detailed description thereof will be omitted.

For the control routine 300, the discharge power limit further constrains the second machine 28. The further constraint may be due to a low state of charge or a low temperature of the battery 30. The further constraint places the positive torque limit at nearly zero, but with the negative torque limit still non-zero. In a step 310, available torque from the engine 14 is boosted to be greater than propulsive torque limit while the second machine 22 operates in a regenerative mode.

While certain embodiments of the present invention have been described in detail, those familiar with the art to which this invention relates will recognize various alternative designs and embodiments for practicing the invention as defined by the following claims.

The invention claimed is:

1. A method of controlling an automotive powertrain comprising:
    controlling an engine and electric machine based on a propulsive torque limit that is a function of a loss of traction;
    stopping the engine when a machine torque limit exceeds the propulsive limit;
    restarting the engine when the propulsive limit exceeds a future machine torque limit.

2. The method of claim 1 wherein the future machine torque limit is a function of a future battery discharge power limit and a predicted vehicle speed.

3. The method of claim 2 wherein the future discharge power limit is a function of a present battery state of charge, a present battery temperature, an average variance rate of the battery state of charge, and an average variance rate of the battery temperature.

4. The method of claim 2 wherein the predicted vehicle speed is a function of a present vehicle speed and a present vehicle acceleration rate.

5. The method of claim 1 wherein the step of controlling the engine and electric machine based on the propulsive torque limit is conditioned upon a vehicle speed being less than a speed threshold and an estimated road friction condition being less than a road friction threshold.

6. The method of claim 1 wherein the machine torque limit is a positive torque limit reduced by a positive torque offset.

7. A method of controlling an automotive powertrain comprising:
    controlling an engine and electric machine based on a propulsive torque limit that is a function of a loss of traction;
    limiting an engine torque while using the engine to supplement the machine when the propulsive limit exceeds a machine torque limit.

8. The method of claim 7 wherein the engine torque is limited to the propulsive torque limit filtered through a low pass filter, reduced by a positive torque limit of the machine, and increased by an engine torque offset margin.

9. The method of claim 7 wherein the machine torque limit is limited to the propulsive torque limit reduced by the propulsive torque limit filtered through a low pass filter, increased by a positive torque limit of the machine, and reduced by an engine torque offset margin.

10. The method of claim 7 wherein the step of controlling the engine and electric machine based on the propulsive torque limit is conditioned upon a vehicle speed being less than a speed threshold and an estimated road friction condition being less than a road friction threshold.

11. A method of controlling an automotive powertrain comprising:
    controlling an engine and electric machine based on a propulsive torque limit that is a function of a loss of traction;
    commanding the machine to operate as a generator while increasing an engine torque limit by an engine torque offset margin.

12. The method of claim 11 wherein a machine torque limit is limited to the propulsive torque limit reduced by the propulsive torque limit filtered through a low pass filter, increased by a positive torque limit of the machine, and reduced by an engine torque offset margin.

13. The method of claim 11 wherein the step of controlling the engine and electric machine based on the propulsive torque limit is conditioned upon a vehicle speed being less than a speed threshold and an estimated road friction condition being less than a road friction threshold.

* * * * *